United States Patent [19]

Batchelder

[11] Patent Number: 6,099,403

[45] Date of Patent: Aug. 8, 2000

[54] INSPECTION APPARATUS FOR VIEWING BOTH SIDES OF A PLURALITY OF COINS IN SUCCESSIVE FASHION

[76] Inventor: Leonard Batchelder, 49101 Card Rd., Maccomb, Mich. 48044

[21] Appl. No.: 09/028,596

[22] Filed: Feb. 23, 1998

[51] Int. Cl.[7] .............................. G07D 9/00; G02B 27/02
[52] U.S. Cl. ............................................ 453/61; 359/801
[58] Field of Search ................... 453/61, 62, 59, 453/31; 359/799, 800, 801, 894; 221/242

[56] References Cited

U.S. PATENT DOCUMENTS

| | | | |
|---|---|---|---|
| 3,047,124 | 7/1962 | Wexler | 453/42 |
| 3,247,757 | 4/1966 | Callaghan | 359/801 |
| 3,767,305 | 10/1973 | Craven | 359/799 |
| 3,905,694 | 9/1975 | Miragliotta | 353/120 |
| 4,542,963 | 9/1985 | Linlor | 359/894 |
| 4,850,511 | 7/1989 | Kral et al. | 221/242 |

Primary Examiner—Robert P. Olszewski
Assistant Examiner—Bryan Jaketic
Attorney, Agent, or Firm—Gifford, Krass, Groh, Sprinkle, Anderson & Citkowski, P.C.

[57] ABSTRACT

An inspection apparatus for viewing both sides of a plurality of coins including a three-dimensional enclosure with a top, a bottom and a plurality of sides in combination defining a hollow interior. A lens is secured within an aperture in the top and provides for magnified viewing of an interior location of the enclosure. A coin supply is secured to the enclosure and is adapted to hold a plurality of coins. The coins are advanced in succession from a holding position to an inspection position for viewing through the lens. A pair of planar shaped reflectors are secured within the enclosure interior and arranged in opposing and angularly extending fashion relative to the lens and the selected coin to be inspected and so as to facilitate a clearer viewing of the selected coin. Following inspection, the coin is ejected and a further coin is transferred from the holding position to the inspection position.

11 Claims, 5 Drawing Sheets

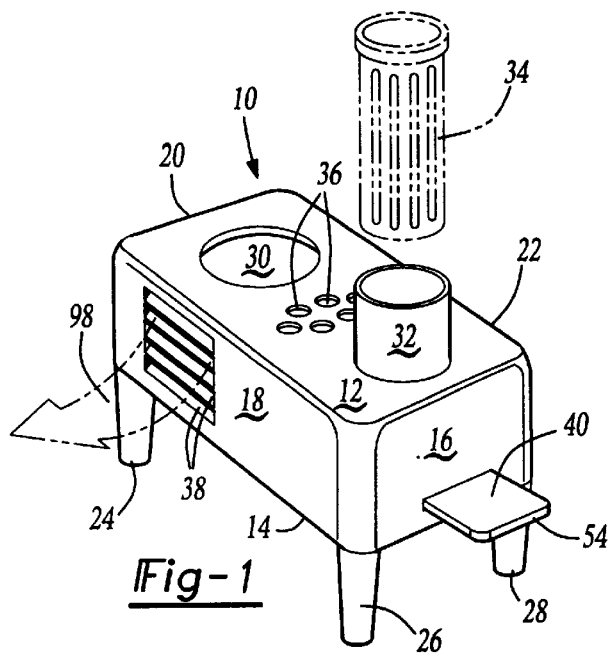
Fig-1
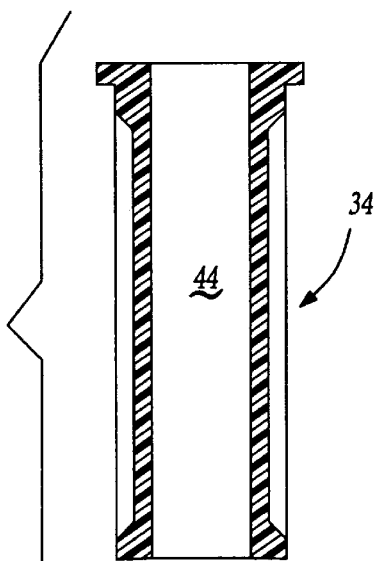
Fig-2
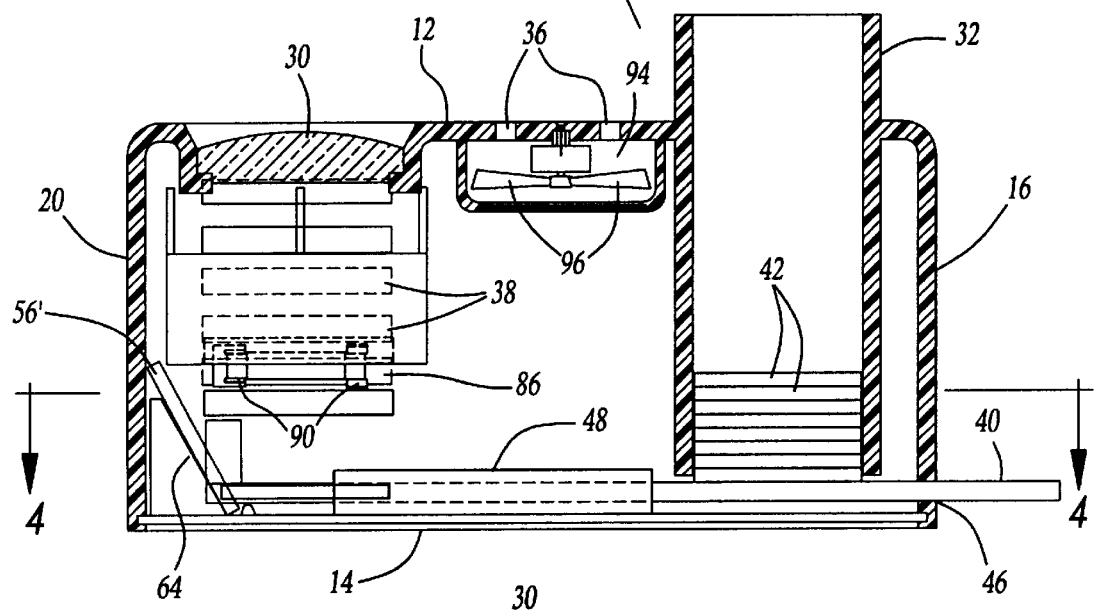
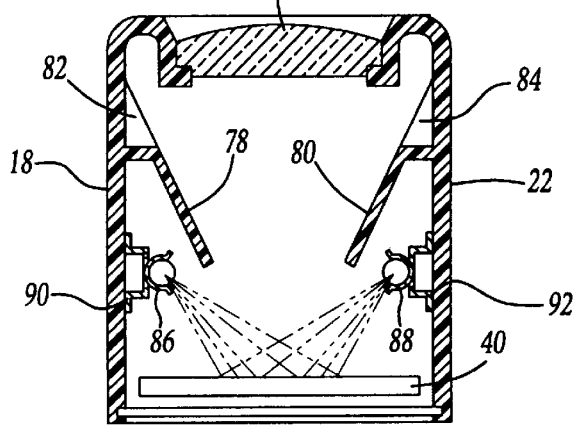
Fig-3

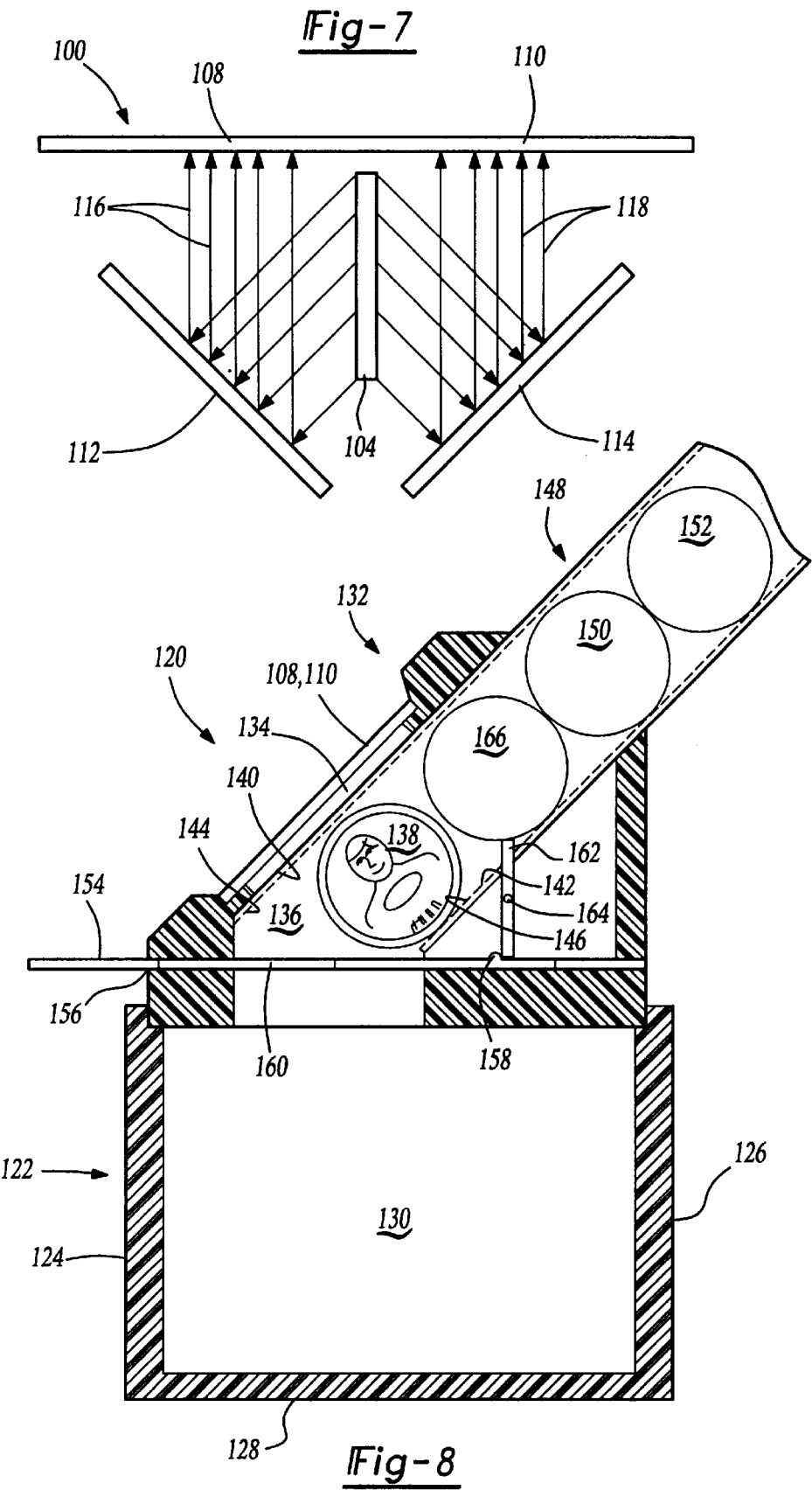

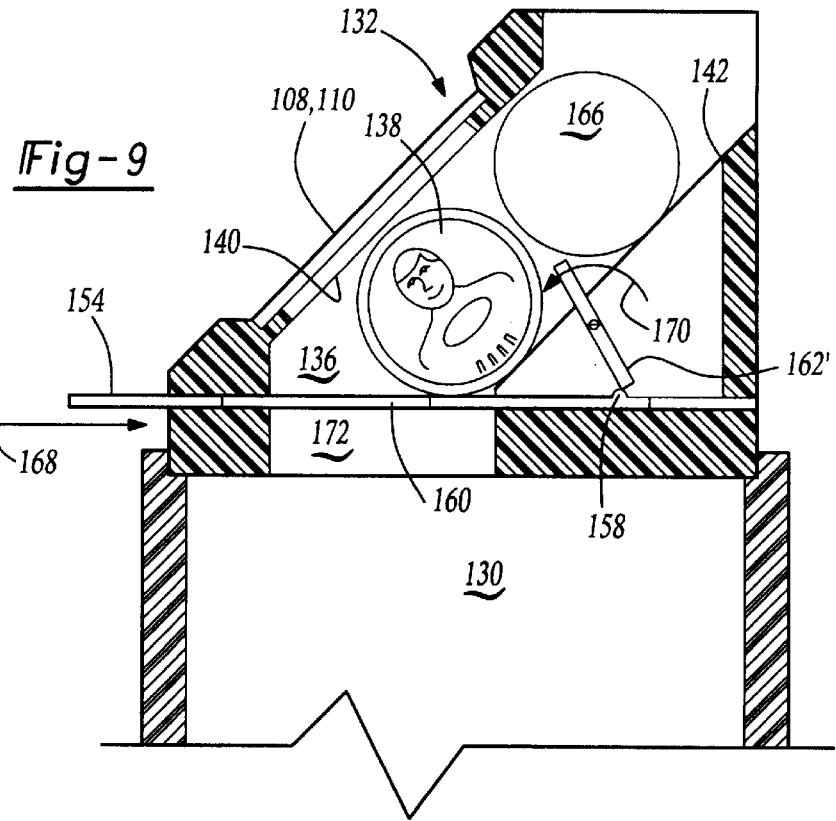
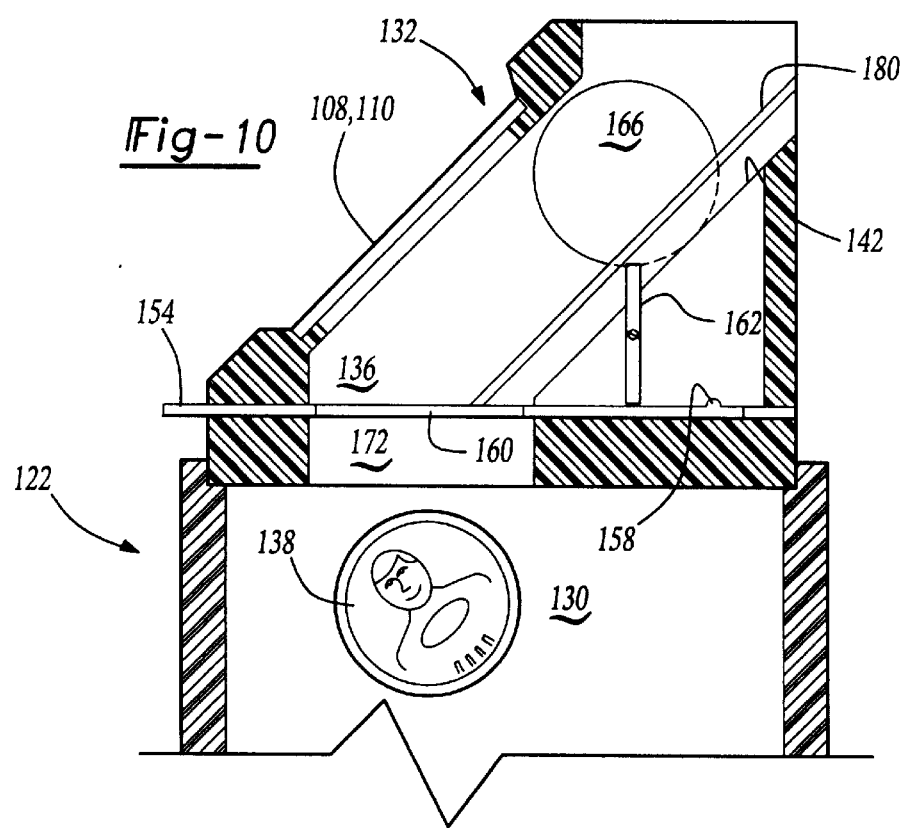

INSPECTION APPARATUS FOR VIEWING BOTH SIDES OF A PLURALITY OF COINS IN SUCCESSIVE FASHION

BACKGROUND OF THE INVENTION

1. Field of the Invention

The present invention relates generally to inspection apparatus for viewing both sides of a plurality of coins, such as is accomplished in the field of numismatics and, more particularly, to an improved inspection apparatus which provides for enhanced viewing of both sides of selected coins in successive fashion.

2. Description of the Prior Art

A prior art example of an inspection apparatus for turning and viewing coins is illustrated in U.S. Pat. No. 3,247,757, issued to Callaghan. The device of Callaghan teaches an inspection apparatus having a generally closed and interiorly hollowed rectangular shape. Arranged within a top surface of the box-like enclosure is a magnifying viewing lens and the lens corresponds with a planar and elongate shuttle member which slides in horizontal fashion in directions inwardly and outwardly of the box-like enclosure. A feed tube or chute is engaged with a further top surface of the enclosure and extends downwardly within the box interior so as to terminate proximate to an upper surface location of the shuttle member.

The feed tube successively feeds coins to the shuttle member upon inward and outward translational motion of the member, the coins being transferred to a first location upon which a first selected side is viewed by a user looking through the lens, a second location in which the coin is flipped over and a reverse side is successively viewed through the lens, and a third location in which the coin is ejected through an aperture formed through a bottom surface of the box-like enclosure. Additional features are provided in the Callaghan apparatus such as an interior light for assisting in viewing the coins, the light being connected to a pair of conventional batteries.

SUMMARY OF THE PRESENT INVENTION

The present invention is an inspection apparatus for viewing both sides of a coin which is submitted to be an improvement over the teachings of Callaghan in that it provides for enhanced viewing of the coin. According to a further preferred embodiment, the inspection apparatus of the invention also provides an improved structure for simultaneously viewing both sides of the coin at once and for selectively ejecting the coin into a selected subdivided portion of a holding base or bin.

The inspection apparatus provides a three-dimensional shaped enclosure having a top, a bottom and a plurality of sides which in combination define a substantially hollowed interior. A lens is secured within an aperture formed in the top and provides magnified viewing of an interior location of the enclosure. A coin supply mechanism is provided which is attached to the enclosure and is adapted to hold a plurality of coins. The coin supply mechanism includes advancing means for transferring a selected coin from a holding position to an inspection position for viewing through the lens. A pair of planar reflectors are secured within the enclosure interior and arranged in opposing and angularly extending fashion relative to the lens and the selected coin to be inspected. Upon completion of the inspection of the selected coin, an ejecting mechanism is provided for removing the selected coin and for advancing a further coin from the holding to inspection position.

According to a first preferred embodiment, the enclosure is defined by a rectangular, box-shaped enclosure and having a lens secured within an aperture formed at a first location in the top. A cylindrical sleeve is integrally formed with and extends downwardly through an aperture in a second location of the top and is adapted to hold a plurality of coins in stacked fashion. An elongate and planar shaped coin advancing member is supported within the enclosure and includes an inner end and an opposite and externally projecting end. The advancing member is capable of being manipulated at the externally projecting end and translated in forward and reverse directions so as to transfer a selected coin from a holding position to an inspection position for viewing through the lens. The planar members are arrayed in their angular extending fashion on opposing sides of the box-like interior and function to both focus and magnify the light rays impinging upon the coin so as to provide a viewer with a clearer view through the magnifying lens.

Additional advantages of the inspection apparatus of the first preferred embodiment include an ejection apparatus formed by a circular aperture formed through the bottom of the enclosure and a leaf spring attached to the bottom and extending over the aperture. The functioning of the device is such that the selected coin passes above the leaf spring when being transferred to the inspection position and, upon completion of inspection, is reverse translated so as to engage a tang of the spring and to pass underneath, at which point it is ejected through the aperture. An inclined ledge surface is further provided at an inner end of the enclosure interior and is engaged in sliding fashion by the selected coin upon the coin being forwardly translated by the advancing member. The inclined ledge surface provides the function of flipping the coin so that a reverse face is displayed in upwardly facing fashion for inspection through the lens. Additional features of the first preferred embodiment include the provision of one of a plurality of coaxially insertable sleeves for establishing a selected reduced diameter within the cylindrical sleeve for inspecting different/smaller selected currencies of coin. Also provided is the provision of low voltage lighting within the enclosure interior as well as a heat sink assembly including a fan and air inlet and outlet passageways for transferring heat generated by the lighting to the exterior of the apparatus.

According to a further preferred embodiment, the inspection apparatus includes an internally hollowed and rectangular shaped base and a coin advancing and inspection unit which is secured to an open top of the base. The unit includes a lens secured within an aperture formed within a forward face of the advancing and inspection unit. In a further preferred variant, the lens consists of first and second lens elements arrayed in side-by-side fashion at the forward location for viewing both sides of the selected coin simultaneously. A slot is formed through the advancing and inspection unit and permits a selected coin to be advanced from the holding to the inspection positions in substantially suspended and visible manner in an open central area of the unit which is visible through the lenses. The slot is formed by forward and rearward parallel and inclined surfaces which are capable of defining a slot therebetween of sufficient dimension to permit transfer of a coin in rolling fashion to the inspection position. The pair of reflectors are mounted within the open interior of the unit so that a first selected reflector reflects a first image associated with a first selected side of the coin for inspection through the first lens and a second selected reflector reflects a second image associated with a second selected side of the coin for inspection through the second lens.

Additional features of the second preferred embodiment include the provision of an elongate and planar member extending through a slot in a lower portion of the unit and engaging the slot to define a stop for a selected coin to be inspected. The elongate and planar member includes a protuberance formed thereon which, as the member is inwardly translated, engages a spring loaded stop member, the stop member defining an abutting boundary between a coin in the holding position and one in the inspection position. Continued inward translation of the elongate member causes the coin in the inspection position to fall through a longitudinally extending slot formed in the member so as to be ejected into the enclosure base of the apparatus. The spring loaded stop is further temporarily rotatably deflected out of the channel upon reverse translation of the elongate member to permit a further selected coin to be advanced to the inspection position, upon which the stop springs back to its undeflected position to abuttingly stop a further selected coin advanced to the holding position. Also incorporated into the base is a pivotable divider wall assembly which is secured to the base so as to direct an ejected coin to fall into a selected subdivided chamber formed in the open base interior.

BRIEF DESCRIPTION OF THE DRAWINGS

Reference will now be made to the attached drawings, when read in combination with the following specification, wherein like reference numerals refer to like parts throughout the several views, and in which:

FIG. 1 is a perspective view of the inspection apparatus for viewing a coin according to a first preferred embodiment of the present invention;

FIG. 2 is a partially exploded view in side cutaway of the interior of the coin inspection apparatus according to the first preferred embodiment;

FIG. 3 is an end cutaway view of the inspection apparatus according to the first preferred embodiment and illustrating in more detail the planar reflecting surfaces and interior illumination means of the present invention;

FIG. 7 is a cutaway view taken along line 7—7 of FIG. 6 and further showing in partial schematic the first and second reflectors arrayed on opposing sides of the coin to be inspected and reflecting the visual images of the coins for inspection through first and second lenses;

FIG. 8 is a side view in cutaway of the coin inspection apparatus according to the second preferred embodiment and including a coin advancing and inspection unit mounted atop a hollow interior base, the coins being in first selected positions according to the present invention;

FIG. 9 is a side view substantially similar to that shown in FIG. 8 and further illustrating the elongate and planar advancing member of the apparatus translating in a first direction and causing a spring loaded stop to pivot while maintaining abutting engagement with a coin in the holding position while a further selected coin in an inspection position is prepared for ejection through a longitudinally extending slot formed in the elongate and planar member according to the present invention;

FIG. 10 is a further view illustrating the formerly inspected coin being ejected into the base of the unit while the next succeeding coin is maintained in its holding position according to the present invention.

DETAILED DESCRIPTION OF THE PREFERRED EMBODIMENTS

Figure 4:
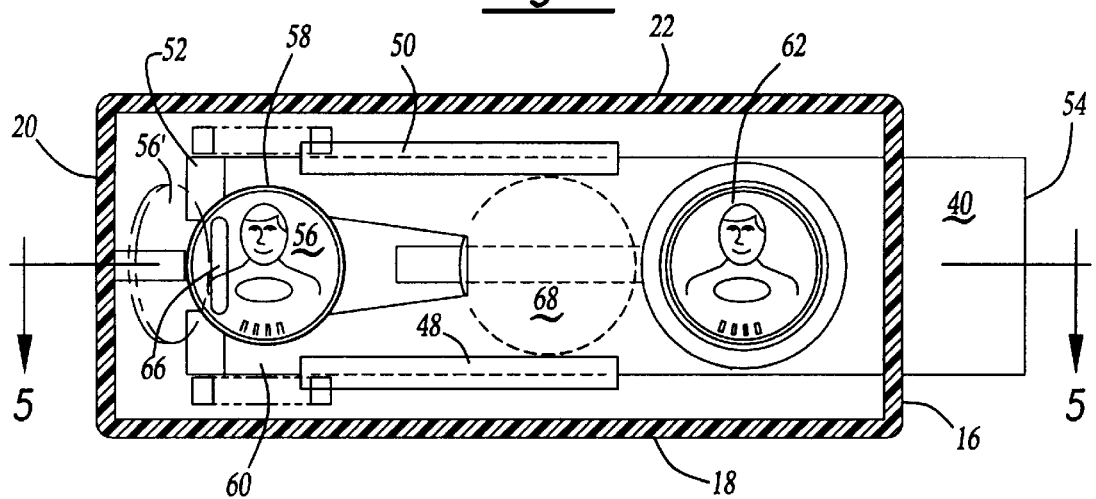
FIG. 4 is a cutaway view taken along line 4—4 of FIG. 2 and further illustrating in top view the workings of the planar shaped coin advancing member according to the first preferred embodiment.

Referring to FIG. 1, an inspection apparatus is shown at 10 for viewing in succession a plurality of coins according to the present invention. The apparatus 10 includes a three-dimensional enclosure which is preferably formed in a generally rectangular box-shape and includes a planar shaped top 12, a like planar shaped bottom 14, a first side 16, a second side 18, a third side 20 and a fourth side 22. The apparatus is supported in upwardly spaced fashion from a ground surface via a plurality of pedestal supports (see supports 24, 26 and 28 with a fourth additional support hidden from view). Additional features which are apparent from the external view of FIG. 1 include a magnifying lens piece 30 which is secured within an aperture formed at a first location in the top 12, a cylindrical shaped sleeve 32 integrally formed with the box-shaped body at a second location of the top 12, and at least one coaxially insertable sleeve 34 capable of being coaxially insertable within the cylindrical sleeve for establishing a smaller selected interior diameter corresponding to the diameter of a further selected size of coin to be inspected.

Also illustrated in the view of FIG. 1 are a plurality of air inlets 36 formed at a further location in the top 12 of the enclosure as well as a further plurality of vents 38 located along second side 18 which serve as air outlets, the function for which will be subsequently described. Finally, FIG. 1 also illustrates an elongate and planar shaped coin advancing member 40 which is translatably supported within the enclosure as will be subsequently described and is capable of transferring selected coins from a holding position to an inspection position.

Referring further to FIG. 2, a side cutaway is shown in partially exploded fashion of the inspection apparatus according to the first preferred embodiment and illustrates the internal features of the apparatus. Specifically, a plurality of coins 42 are illustrated in stacked arrangement within the open cylindrical interior established by the cylindrical sleeve 32, the sleeve in turn being integrally formed with the enclosure and extending downwardly within its interior to terminate at a selected location above a bottom surface of the interior. The coaxially insertable sleeve 34 is again shown in exploded and cutaway fashion and defines the smaller selected interior diameter 44 described in FIG. 2 for accommodating coins of different/smaller currency. It is further understood that insertable sleeves of differing diameters may be employed as an accessory kit to the present invention.

The elongate and planar shaped member 40 is secured for translatable motion within the box-shaped enclosure by means of a horizontally arrayed and slot shaped aperture 46 formed along a lower location of the first side 16. The elongate and planar member 40 is supported in guided fashion by a pair of opposed and horizontally arrayed guide members 48 and 50 (see also FIG. 4), the guide members 48 and 50 being secured to a bottom interior of the enclosure interior. As is also evident from FIGS. 2 and 4 when viewed in combination, the guide members 48 and 50 are inwardly channeled as is evidenced by the phantom lines so as to securely restrain in translation direction therebetween the elongate and planar member 40. The member 40 also includes an inner end 52 (see FIG. 4) and an opposite and externally projecting end 54 which extends outwardly beyond the first side 16 as is also shown in FIG. 1.

Referring again to FIG. 4, the elongate and planar shaped member 40 includes a receiving location for supporting thereupon a selected coin 56 for advancing from a holding position to an inspection position underneath the viewing lens. Specifically, the receiving location defined at the inner end 52 of the elongate and planar member is provided by a pair of spaced apart supporting members 58 and 60 which are curved along their inner and opposing surfaces for supporting therebetween the selected coin 56. While the illustration of FIG. 4 illustrates the elongate and planar shaped member 40 in a fully forwardly translated position, it is understood that the elongate member 40 is initially fully retracted to a position whereupon the receiving location is aligned with the stack of coins 42 held within the cylindrical sleeve, a lower-most of which is illustrated schematically at 62 in a holding position and capable of being seated upon the planar member 40 prior to advancing to the inspection position.

The operation of the planar shaped member 40 will now be described and begins with the receiving location acquiring a selected coin (say in this case coin 56) from a bottom-most location of the stack of coins 42 held within the cylindrical sleeve 32. Upon acquiring the selected coin 56, the planar member is translated forwardly within the enclosure to an inspection position, this position being defined as arranged directly underneath the viewing and magnifying lens 30 and approximate to the position illustrated by the coin 56 in FIG. 4. At this point, a first selected side of the coin is inspected through the viewing lens 30, the lens being of any suitable type for providing clear and magnified viewing of the coin.

Figure 5:
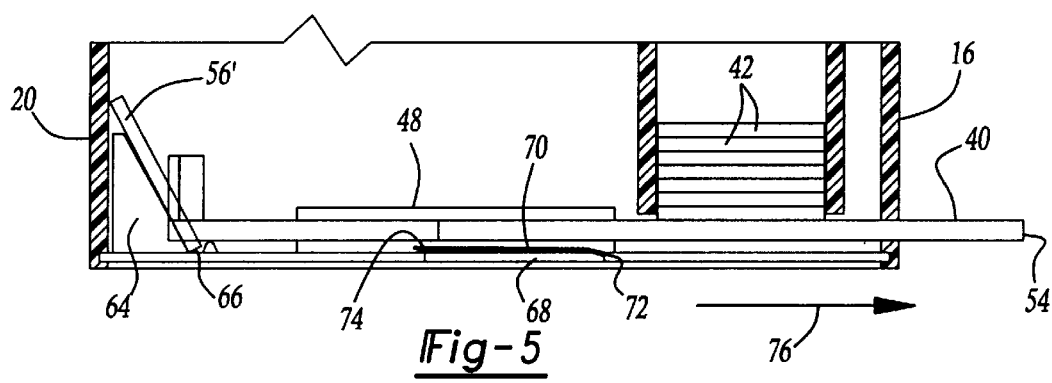
FIG. 5 is a side view of the illustration of FIG. 4 and further showing the operative relationship between such features as coin advancing member, the cylindrical shaped coin supply sleeve, the inclined edge surface and the coin ejection mechanism.

Referring again to FIGS. 2, 4 and 5, and upon completion of the inspection of the first selected side of the coin, the planar and elongate member 40 is further translated an incremental additional distance to a forward-most location, at which point the coin 56 slidably engages an inclined edge surface 64 and begins to slid upwardly as illustrated at 56'. Upon being fully engaged upon the inclined edge 64, a bottom circumferential edge of the coin in the position illustrated at 56' is seated within a cross slot 66 formed in the bottom of the enclosure interior in proximity to the inclined edge surface 64. The elongate and planar member 40 may be further pushed inwardly to a fully inserted position, at which point the slidingly engaged coin 56' is caused to flip in response to the abutting contact and so that a reverse side of the coin is displayed upon the coin becoming reseated upon receiving member. The coin in this position is capable of once again being inspected through the lens 30 in the same fashion as previously described.

Upon completion of the inspection stage of a selected coin, an ejection mechanism is employed for efficiently ejecting the coin from within the apparatus enclosure. The ejection mechanism includes a circular aperture 68 illustrated in phantom in FIG. 4 and schematically in FIG. 5. The aperture 68 is formed in the bottom 14 of the apparatus enclosure and is covered by a leaf spring 70, the leaf spring including an end 72 secured to the bottom 14 and an opposite end terminating in an upwardly angled tang portion 74. The construction of the ejection mechanism is such that the selected coin 56, upon being acquired from the stack of coins held within the cylindrical sleeve and forwardly shuttled to the inspection stage, passes over and upon the leaf spring 70 so as to not fall through the circular aperture 68. Upon completion of the inspection stage, the elongate and planar shaped member 40 is rearwardly translated in a direction illustrated by arrow 76 in FIG. 5, whereupon the seated coin 56 engages the upwardly angled tang portion 74, further translation causing the tang to deflect upwardly over the circumferential edge of the coin and the coin to further translate underneath, rather than above, the leaf spring 70 and to eject through the aperture 68.

Additional features are provided the first preferred embodiment 10 of the inspection apparatus according to this invention and these include, referring specifically to FIG. 3, a pair of planar reflectors 78 and 80 which are secured within opposing sides 18 and 22 of the enclosure interior by such additional members as gusset plates 82 and 84, respectively. The planar reflectors are secured in opposed and angularly extending fashion such that vision and light rays originating through the lens 30 are reflected focused on the coin and the image of the coin is most clearly defined through the lens.

An additional feature is provided by a pair of low-voltage lighting elements 86 and 88, the elements 86 and 88 being mounted, respectively, to the interior sides 18 and 22 by mounting elements 90 and 92 so that the elements 86 and 88 provide illumination to a lower open area of the enclosure which surrounds the coin in an inspection position. A still further feature of the first preferred embodiment of the invention is provided by a portable and electrically powered fan 94 (see FIG. 2) which is mounted to an inside surface of the top 12 of the enclosure in proximity to the plurality of air inlets 36. The fan includes a plurality of individual blades 96 which rotate so as to draw a constant current of air through the air inlets 36, circulate the air current throughout the interior of enclosure, and to collect the heat generated by the lighting elements 86 and 88 which is subsequently heat-sinked through the outlet vents 38 as illustrated by arrow 98 in FIG. 1.

Figure 6:
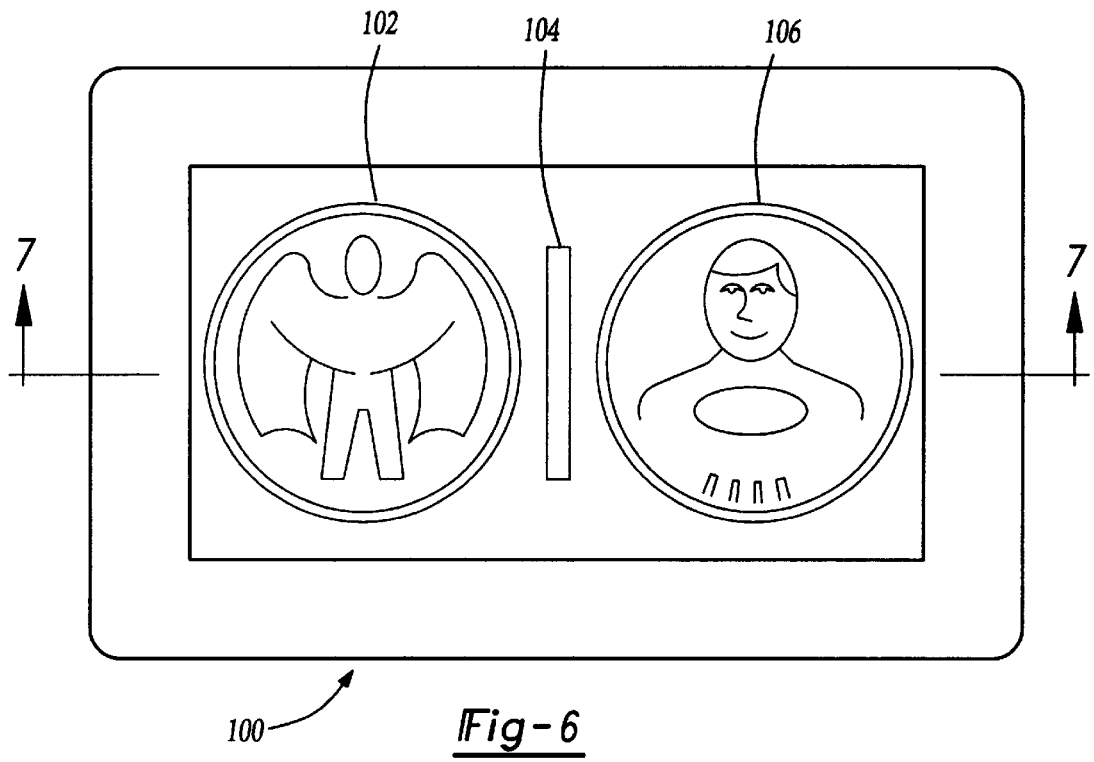
FIG. 6 is an illustrative view of two sides of an inspected coin which are visible simultaneously through a lens according to a second preferred embodiment of an inspection apparatus according to the present invention.

Referring now to FIG. 6, a simultaneous visual image is shown of both sides of a coin for viewing through an appropriate lens of an inspection apparatus according to a further selected embodiment 100 of the present invention. Specifically a first image is illustrated by face 102 of a coin 104 and a second simultaneous and reverse image is illustrated by face 106. Referring further to FIG. 7, additional explanation of the ability to illustrate both faces of the selected coin 104 simultaneously is provided and includes the lens assembly of the second preferred embodiment being provided as a first lens portion 108 and a second lens portion 110 arranged in side by side fashion. A first reflector 112 is secured within an interior of the apparatus (to be further described) in such a fashion that it is capable of reflecting a first image associated with the first selected side 102 of the coin for inspection through the first lens 108. A second reflector 114 is likewise secured in angularly and opposing fashion such that it reflects a second image associated with the second selected side 106 of the coin for inspection through the second lens 110. The reflected images are further illustrated by parallel extending pluralities of lines 116 and 118 which associate between the lenses 108 and 110 and the arrayed reflectors 112 and 114, respectively, for presenting the images 102 and 106 through the lenses 108 and 110.

Referring now to FIG. 8, a side view in cutaway is illustrated at 120 of the coin inspection apparatus according to the second preferred embodiment of the present invention. A base 122 is provided and includes a plurality of sides (illustrated in cutaway with opposing sides 124 and 126) and a bottom 128, the sides and bottom defining in combination an open and substantially hollow interior 130. A coin advancing and inspection unit 132 is mounted to an open top of the base 122 and likewise includes a three dimensional enclosure body. The lenses 108 and 110 of the second preferred embodiment are secured within an angled forward face 134 of the unit 132 and the apparatus 120 further provides an interior extending channel 136 which is capable of holding a plurality of coins (illustrated by coin 138) for controlled and successive feed of coins from the holding position to the inspection position.

Referring again to FIG. 8, an inner surface of the forward face 134 of the unit 132 is illustrated at 140 and is defined in spaced and parallel fashion from an associated rearward and inclined surface 142 so as to define the channel 136 for permitting feed of the coins. As is further evident, the opposing inner surfaces 140 and 142 may each be further defined by a narrow and opposing channel which is established by phantom lines 144 and 146, these lines defining a narrowed cross wise extending slot for permitting the coins to feed in downward and angular fashion and so that they may otherwise be substantially visible in suspended and simultaneous fashion as is described in FIGS. 6 and 7 for viewing through the magnifying lenses 108 and 110. A magazine is shown at 148 which is capable of being secured to an upper portion of the coin advancing and inspection unit 132. The magazine is configured so that it is securable in end to end fashion with an upper end of the coin feed and facilitates the carrying of additional coins 150 and 152 for feeding into the apparatus.

Referring again to FIG. 8, additional features of the inspection apparatus of the second preferred embodiment include an elongate and planar member 154 which extends through a slot 156 formed in cross wise extending fashion along a edge portion of the advancing and inspection unit 132 so that the member 154 is translatable in directions inwardly and outwardly relative to the unit 132. The elongate and planar member 154 includes a protuberance 158 formed upon an upper surface thereof at a first selected location and also includes a longitudinally extending slot 160 formed through the member 154 at a second location.

In the view of FIG. 8, the member 154 is at a first position in which the protuberance 158 is located on a first selected side of a spring loaded stop member 162. The stop member 162 is provided as an elongate detent member which is pivotally secured to the inspection unit 132 about a spring loaded pivotal connection 164 and so that the stop member 162 is constantly biased in an upwardly extending manner and provides an abutting stop within the channel 136 for preventing a further selected coin 166 from advancing from the holding to inspection position. Also, while the drawing figures of the second preferred embodiment, particularly those of FIGS. 8–11 are illustrated in side cross section, it is understood that the apparatus disclosed is capable of holding a succession of desired coins in angular fashion such as is disclosed and appropriate design and engineering as is known in the art may be employed to provide the desired functionality to the device.

Referring to FIG. 9, a further side view is illustrated of the coin inspection apparatus in which the elongate and planar member 154 is inwardly translated a selected longitudinal distance along line 168 resulting from grasping of the projecting end portion of the member 154 by a user. Responsive to inward translation, the upwardly positioned protuberance 158 engages a lower end of the spring loaded stop portion, causing the stop portion to pivot along curved directional arrow 170 to a further position 162'.

At position 162', the stop member is still in abutting contact with a circumferential edge portion of the further selected coin 166 in the holding position while, referring further to FIG. 10, continued inward translation of the member 154 causes the protuberance 158 to clear the reverse side of the stop member, causing the spring loaded member to spring back to its originally upwardly extending and undetected position. At this point, the spring member 162 is still retained in an abutting contact with the further selected coin 166 while the longitudinally extending slot 160 aligns with the channel 136 formed within the unit 132 so that the slot 160 communicates the channel 136 with a further lower channel portion 172 leading into the collection bin of the base 122. Upon aligning of the slot 160 with the channels 136 and 172, the selected coin 138 previously in the inspection position is ejected through the slot 160 and into the collection base.

Figure 11:
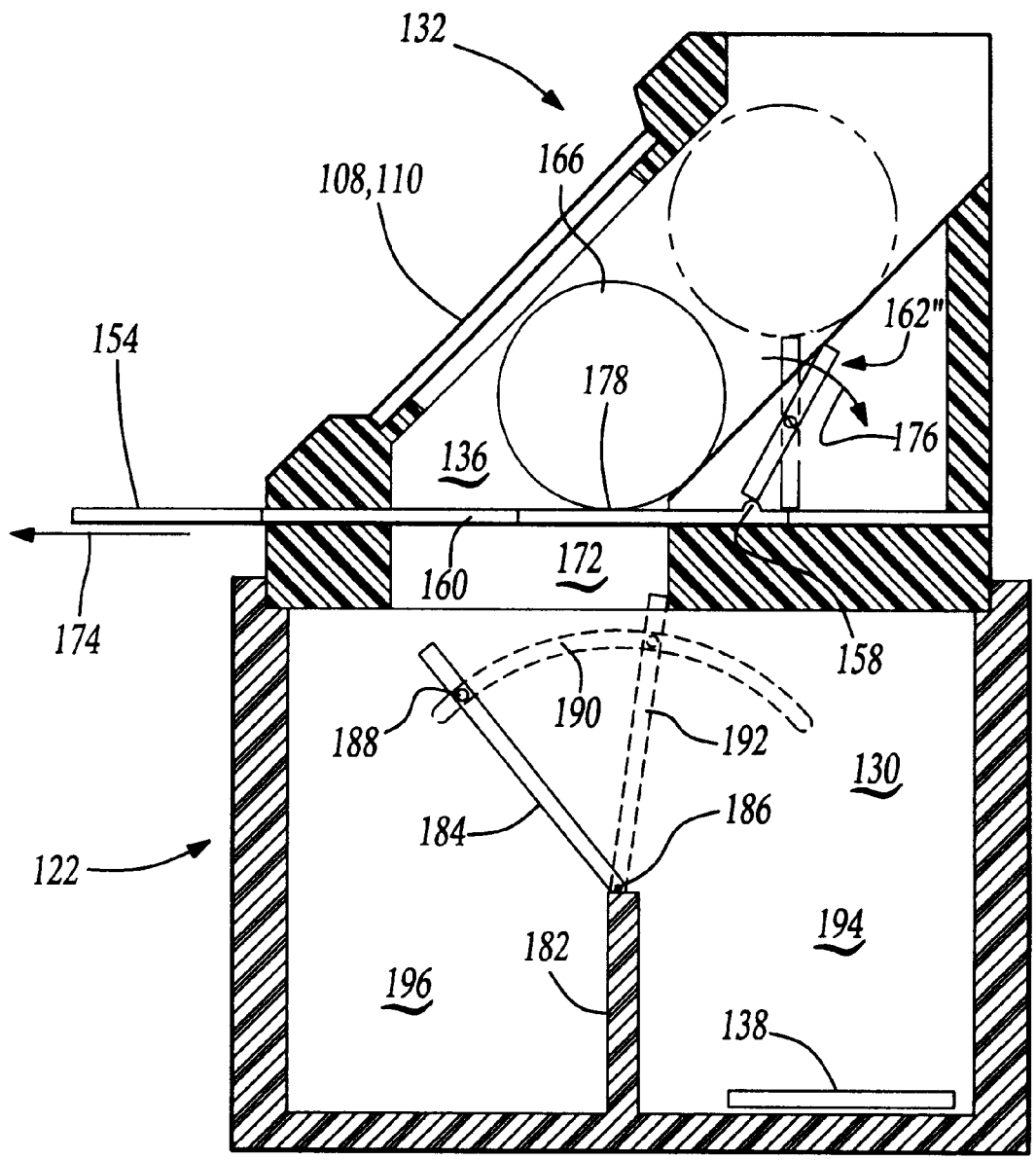
FIG. 11 is a further view illustrating the elongate and planar member being translated in a reverse and outward fashion, whereupon the stop member is temporarily deflected out of the way of the coin advancing channel and the next succeeding coin is advanced to the inspection position.

Referring further to FIG. 11, the elongate and planar member 154 is translated in a reverse and outward direction along directional line 174, causing the longitudinal slot 160 to once again be removed from communication with the channels 136 and 172 leading into the collection bin of the base. The protuberance 158 once again engages the spring loaded stop member from the opposite side and causes the stop member to pivot about rotational line 176 to a position 162" at which point the spring loaded stop member is temporarily removed from abutting communication with the coins in the channel. As a response, the next succeeding coin 166 has sufficient time to roll downwardly to the inspection position and whereupon a bottom circumferential edge portion 178 of the coin engages the upper surface of the planar and elongate member 154.

Additional features of the further preferred embodiment include the formation of a single guide channel 180 (see FIG. 10) formed upon the rearward inclined surface 142. The provision of a single channel 180 (as opposed to upper and lower guide channels as illustrated at 144 and 146 in FIG. 8) is that the single lower channel is capable of accommodating a plurality of differently sized coins, particularly those of smaller diameter than a largest specified coin of perhaps quarter or half-dollar size. In contrast, the arrangement of the opposing parallel guides 144 and 146 in the earlier described variant require the coin to be within a fairly small range in size, possibly limiting its applicability.

Referring finally again to FIG. 11, subdividing means are provided within the interior 130 of the base 122 for causing a selected coin (coin 138) to fall into a designated one of at least two chambers. Specifically, a planar and upwardly extending dividing wall 182 is secured to the bottom of the base 122 and extends upwardly to an intermediate location within the interior 130. A further planar shaped member 184 is pivotally secured along a top edge 186 of the dividing wall 182 and extends substantially to the open top of the base. The planar shaped member 184 includes a laterally projecting actuation portion 188 (or gripping piece) which extends outwardly through an exterior wall of the base (not shown in the side cutaway of this view) and is guided along a curved channel 190 illustrated in phantom and which is capable of being rotated to a further position 192 also shown in phantom. Accordingly, the coin 138 is capable of being deposited into a first subdivided chamber 194 when the planar shaped member 184 is pivoted to the position illustrated in solid line. A further such coin would then be deposited into a further subdivided chamber 196 upon rotating the member 184 to the position illustrated in phantom at 192 and the purpose of doing this would be to separate good coins from bad coins during the successive inspection process.

Having described my invention, it will become apparent to those skilled in the art to which it pertains that it described a novel and improved coin inspection apparatus and that further preferred embodiments will become evident in view of the appended claims.

I claim:

1. An inspection apparatus for viewing both sides of a plurality of coins which are fed into said apparatus in successive fashion, said inspection apparatus comprising:

a three-dimensional enclosure having a top, a bottom and a plurality of sides which in combination define a substantially hollowed interior;

a lens secured within an aperture formed at a first location in said top, said lens providing magnified viewing of an interior location of said enclosure;

a cylindrical sleeve integrally formed with and extending downwardly through a second location in said top, said sleeve adapted to hold the plurality of coins in stacked fashion;

an elongate and planar shaped coin advancing member, said advancing member being supported within said enclosure and including an inner end and an opposite and externally projecting end, said advancing member capable of being manipulated at said externally projecting end and translated in forward and reverse directions so as to transfer a selected coin from a holding position to an inspection position for viewing through said lens;

a pair of planar reflectors secured within said enclosure interior on opposite sides thereof by gusset plates and arranged in downwardly and inwardly angled fashion relative to said lens and the selected coin to be inspected, said reflectors facilitating a clearer viewing through said lens of the selected coin; and ejection means for ejecting said selected coin following viewing through said lens.

2. The inspection apparatus as described in claim 1, said elongate and planar shaped advancing member further comprising a receiving location for receiving the selected coin from said cylindrical sleeve, forward translation of said advancing member causing the coin to be advanced to the inspection position, said inspection position residing between a forward-most and a rearward-most position of said advancing member.

3. The inspection apparatus as described in claim 1, further comprising a pair of horizontally arrayed guide members secured proximate to a bottom interior surface of said enclosure and receiving therebetween said elongate and planar shaped coin advancing member for forward and reverse translational motion.

4. The inspection apparatus as described in claim 2, further comprising an inclined edge surface within said enclosure interior which slidably engages the selected coin supported upon said coin advancing member in said forward-most translated position, a cross slot being formed in said bottom of said enclosure in proximity to said inclined edge surface and which, responsive to said forward translation of said advancing member, seats a circumferential edge portion of the slidingly engaged coin causing the coin to flip in response to abutting contact with a forward edge of said advancing member inner end and so that a reverse side of the coin is displayed upon the coin once again being received upon said advancing member, said reverse side capable of being inspected through said lens.

5. The inspection apparatus as described in claim 4, further comprising a circular aperture formed through an intermediate location in said bottom of said enclosure, a leaf spring securing at one end to said bottom and extending in lengthwise fashion over said circular aperture, said leaf spring further including an upwardly curved tang such that, upon rearward translation of said advancing member after inspection of the selected coin, said tang deflects upwardly over the circumferential edge of the coin, causing the coin to be translated rearwardly underneath said leaf spring and to be ejected through said circular aperture.

6. The inspection apparatus as described in claim 1, further comprising at least one coaxially insertable sleeve for insertion within said cylindrical sleeve, said insertable sleeve establishing a smaller selected interior diameter which corresponds with a diameter of a further selected size of coin to be inspected.

7. The inspection apparatus as described in claim 1, further comprising a pair of low voltage lights mounted within said enclosure interior, said lights providing illumination of the selected coins at said inspection position.

8. The inspection apparatus as described in claim 7, further comprising heat dissipation means incorporated into said inspection apparatus enclosure for removing heat resulting from illumination by said lights.

9. The inspection apparatus as described in claim 8, further comprising a portable and electrically powered fan with rotating fan blades, said fan being mounted to an inside surface of said top and is accessible to a surrounding environment through a plurality of air inlets formed through said top, said fan generating and circulating a constant current of air within said enclosure, at least one vent being formed upon a selected side of said enclosure and facilitating heat accumulations within said enclosure to be heat sinked by said air current through said vent.

10. The inspection apparatus as described in claim 1, further comprising a set of pedestal supports for upwardly displacing said enclosure bottom from a ground surface.

11. An inspection apparatus for viewing both sides of a plurality of coins which are fed into said apparatus in successive fashion, said inspection apparatus comprising:

a three-dimensional enclosure having a top, a bottom and a plurality of sides which in combination define a substantially hollowed interior;

a lens secured within an aperture formed at a first location in said top, said lens providing magnified viewing of an interior location of said enclosure;

a cylindrical sleeve integrally formed with and extending downwardly through a second location in said top, said sleeve adapted to hold the plurality of coins in stacked fashion;

at least one coaxially insertable sleeve for insertion within said cylindrical sleeve, said insertable sleeve establishing a smaller selected interior diameter which corresponds with a diameter of a further selected size of coin to be inspected;

an elongate and planar shaped coin advancing member, said advancing member being supported within said enclosure and including an inner end and an opposite and externally projecting end, said advancing member capable of being manipulated at said externally projecting end and translated in forward and reverse directions so as to transfer a selected coin from a holding position to an inspection position for viewing through said lens;

a pair of planar reflectors secured within said enclosure interior and arranged in opposing and angularly extending fashion relative to said lens and the selected coin to be inspected, said reflectors facilitating a clearer viewing of the selected coin; and ejection means for ejecting said selected coin following viewing through said lens.

* * * * *